US010202810B2

(12) United States Patent
Didry (10) Patent No.: US 10,202,810 B2
(45) Date of Patent: Feb. 12, 2019

(54) DRILL-STRING LINER ELEMENT FURNISHED WITH AN IMPROVED HARDBANDING LAYER (71) Applicant: VALLOUREC DRILLING PRODUCTS FRANCE, Cosne Cours sur Loire (FR)

(72) Inventor: Thomas Didry, Lille (FR)

(73) Assignees: TUBOSCOPE VETCO (FRANCE) SAS, Berlaimont (FR); GRANT PRIDECO, L.P., Houston, TX (US)

( * ) Notice: Subject to any disclaimer, the term of this patent is extended or adjusted under 35 U.S.C. 154(b) by 140 days.

(21) Appl. No.: 15/106,477

(22) PCT Filed: Dec. 22, 2014

(86) PCT No.: PCT/FR2014/053516
§ 371 (c)(1),
(2) Date: Jun. 20, 2016

(87) PCT Pub. No.: WO2015/092340
PCT Pub. Date: Jun. 25, 2015

(65) Prior Publication Data
US 2016/0340985 A1    Nov. 24, 2016

(30) Foreign Application Priority Data
Dec. 20, 2013  (FR) ...................................... 13 63310

(51) Int. Cl.
E21B 17/10    (2006.01)
B23K 9/04    (2006.01)
(Continued)

(52) U.S. Cl.
CPC .......... *E21B 17/1085* (2013.01); *B23K 9/046* (2013.01); *B23K 9/126* (2013.01);
(Continued)

(58) Field of Classification Search
USPC ........... 166/241.4, 241.6; 428/216, 332, 469, 428/472, 698; 427/446, 449, 450, 451,
(Continued)

(56) References Cited

U.S. PATENT DOCUMENTS 3,139,511 A * 6/1964 Kudelko ................ B23K 9/032
219/137 R
4,243,727 A * 1/1981 Wisler ..................... C23C 4/06
428/610

(Continued)

FOREIGN PATENT DOCUMENTS

GB    2 125 466 A    3/1984
RU    79062 U1    12/2008
(Continued)

OTHER PUBLICATIONS

International Search Report dated Oct. 19, 2015 in PCT/FR2014/053516 filed Dec. 22, 2014.
(Continued)

*Primary Examiner* — Archene A Turner
(74) *Attorney, Agent, or Firm* — Conley Rose, P.C.

(57) ABSTRACT

A drill-string liner element includes at least one hardbanding layer. The hardbanding layer includes one or more strands of filler metal, each having a width between 1 and 5 millimeters and deposited in adjacent manner to form a substantially continuous layer over a zone of the element. The hardness in the thickness of the layer varies by less than 10 HRC over the zone.

21 Claims, 7 Drawing Sheets (51) Int. Cl.
*B23K 9/173* (2006.01)
*B23K 9/12* (2006.01)
*E21B 17/00* (2006.01)
*E21B 17/16* (2006.01)
*B23K 101/00* (2006.01)
*B23K 101/20* (2006.01)

(52) U.S. Cl.
CPC .............. *B23K 9/173* (2013.01); *E21B 17/00* (2013.01); *E21B 17/16* (2013.01); *B23K 2101/002* (2018.08); *B23K 2101/20* (2018.08)

(58) Field of Classification Search
USPC ................... 427/455, 456; 175/325.1, 325.5; 219/76.1, 76.11, 76.14, 121.11, 121.14, 219/121.48, 137 R
See application file for complete search history.

(56) References Cited

U.S. PATENT DOCUMENTS

| | | | |
|---|---|---|---|
| 4,431,902 A | 2/1984 | Wallen | |
| 4,948,936 A * | 8/1990 | Landry | B23K 9/046 219/76.14 |
| 6,627,839 B1 * | 9/2003 | Luckowski | B23K 9/1735 219/76.14 |
| 2009/0301709 A1 * | 12/2009 | Cooper | E21B 23/14 166/241.5 |
| 2013/0118728 A1 | 5/2013 | David | |
| 2013/0149552 A1 | 6/2013 | Yao et al. | |
| 2013/0168107 A1 * | 7/2013 | O'Blenes | E21B 19/22 166/381 |
| 2013/0266820 A1 | 10/2013 | Kusinski et al. | |
| 2014/0251595 A1 * | 9/2014 | Buytaert | E21B 19/24 166/241.1 |

FOREIGN PATENT DOCUMENTS

| | | |
|---|---|---|
| RU | 2356708 C1 | 5/2009 |
| SU | 1329931 A1 | 8/1987 |
| WO | WO 94/08747 A1 | 4/1994 |
| WO | WO 02/058927 A1 | 8/2002 |

OTHER PUBLICATIONS

European Examination Report dated Jul. 2, 2018, for European Application No. 14831004.8 (7 p.).
Fronius Brochure "Cold Metal Transfer," Techniques de soudage, Sep. 29, 2011 (16 p.).
Russian Examination Report dated Jul. 6, 2018, for Russian Application No. 2016129467 (7 p.).
English Translation of Russian Examination Report dated Jul. 6, 2018, for Russian Application No. 2016129467 (5 p.).

* cited by examiner

DRILL-STRING LINER ELEMENT FURNISHED WITH AN IMPROVED HARDBANDING LAYER

The invention relates to a drill-string liner element. It also relates to a method for hardbanding such an element.

Elements of this type are used in particular in the field of oil drilling, to form a drill string that extends from the surface of a well to its bottom.

These elements comprise in particular the "drill pipes" (in English), the "heavyweight drill pipes" (in English) and the "drill collars" (in English). For example, they are covered by the specifications of the American Petroleum Institute or "API" pertaining to the technique.

During service, the drill-string liner elements are subjected to abrasion phenomena because of friction between their exterior surface and the wall of the well, and/or between this surface and the drilling cuttings ascending in the well.

The widest parts of these elements are exposed the most to the abrasion phenomenon. At their level in fact, the spacing between the liner element and the wall of the well is narrowed, which results in a reduction of the cross section available for passage of the cuttings and a closeness of the outer surface of the element to the wall of the well.

It is known that the resistance of liner elements to abrasion can be improved by partly lining the outer surface thereof with a hardened surface layer, also known as "hardbanding" layer in English, or else "rechargement" layer in French. In practice, this type of lining is limited to the portions of the element that have the largest dimensions and/or are the thickest.

In general, hardbanding consists of depositing filler material, the composition of which is chosen for its hardness properties, over part of the outer surface of the element. The material is traditionally deposited according to a method derived from electric arc welding: a torch of MIG/MAG type and a rod forming a consumable electrode with composition corresponding to the filler material are used. The hardbanding is applied in successive layers, each of which surrounds the drill-string liner element, each band being formed as a strand of material deposited by oscillation of the torch along the length of the element.

Once the lining has worn off, the liner can be withdrawn from the drill string and new hardbanding applied. In practice, hardbanding is programmed periodically.

It is customary to calculate a nominal value for the thickness of the hardbanding layer, more exactly the thickness of each band/strand, on the basis of a minimum useful service life for the hardbanded element and of a rate of wear of the hardbanding layer. This rate of wear is generally evaluated over a small thickness of one test layer of hardbanding.

With a filler material of common composition, and with a target service life of approximately 80 hours, nominal thickness values close to 2.4 millimeters are obtained.

Because the service life of the element is limited by the wear of the hardbanding layer, it is customary to apply a large tolerance to the calculated thickness value. For a nominal value of 2.4 millimeters, for example, thicknesses ranging between 2.4 and 4 millimeters are generally tolerated.

Over time, it has become apparent that there is a need to modify this hardbanding technique, and in particular to improve the service life of the element, of the hardbanding layer.

U.S. Pat. No. 2011/0220348 A1, for example, relates to a phenomenon known as "dilution" according to which part of the base material of the liner element migrates into the hardbanding layer. This leads to alteration of the properties of the hardbanding layer. That document proposes to interpose a layer of special material between the outer surface of the naked element, the skin, and a hardbanding layer made of a material with low coefficient of friction.

U.S. Pat. No. 4,256,518 is preoccupied with what is known as the "heat-affected zone", in other words the part of the liner element in which the crystallographic structure of the base material is modified by the deposition of the filler material at high temperature. This document provides in particular for a heat treatment after deposition of the filler material and/or for application of an interposed layer of special material between the skin of the element and the hardbanding layer.

Other documents treat the hardness and/or the homogeneity of the lining. Most often, they propose a filler material having a special composition.

On this subject, U.S. Pat. No. 4,243,727, for example, proposes a lining wherein the hardness increases with depth, from 55.2 HRC at the surface to 68.4 HRC close to the skin of the element. This singular variation of hardness is achieved by virtue of a special composition of the filler material.

WO 2011/053928 A1 divulges a lining wherein the erosion behavior and the hardness are improved by a special composition of the lining.

The already mentioned U.S. Pat. No. 2011/0220348 A1 claims to obtain a lining of hardness between 60 HRC and 70 HRC. In reality, the hardness properties of the lining in question result from a special composition of the interposed layer and from a method of deposition by plating.

Some authors try to modify the technique used for deposition, and more particularly to develop technologies based on plasma laser.

U.S. Pat. No. 2011/0220348 proposes to use techniques known as "thermal spraying", or "projection thermique" in French, which consists in spraying the filler material in the form of powder particles or of wire onto a substrate, or else as "laser/electron beam" or "soudage laser" in French, which consists in spraying the filler material in the form of a metal powder onto the piece across the beam of a power laser. These techniques require that the material be fed in a special form, especially of powder.

FR 2570084 teaches how to harden the bands of the hardbanding layer by laser over a depth of approximately 1 millimeter without heating the band to the melting point.

From there, the Applicant has made the following observation: all or almost all of the proposed improvements to be made to the technique of hardbanding, at least those aimed at improving the service life thereof and/or of the hardbanded elements, result in or require a special filler material, having a specific composition and/or form.

In practice, however, the user has very little freedom as to the choice of composition of the filler material. Firstly, a standard applicable to the composition of the filler material exists and constitutes a framework in the field of drilling. Secondly, the exact composition of an electrode rod, within the scope of the freedom permitted by the standard, is generally a manufacturing secret. Finally, the users customarily procure the electrode rod from one and the same supplier, which assures them, to a certain degree, constant performance that is in conformity with their tests. In other words, the user does not test a composition of filler material but instead the rod of this or that manufacturer.

The Applicant has therefore set the objective of improving the technique of hardbanding independently of the composition of the filler material.

Another objective of the invention is to improve the performances of the liner element or of the hardbanding layer itself, while using the traditional electrode rods, such as sold, for example by ARNCO or Tuboscope.

Firstly a drill-string liner element is proposed of the type comprising at least one hardbanding layer, wherein the hardbanding layer comprises one or more strands of filler metal, each having a width between 1 and 5 millimeters and deposited in adjacent manner to form a substantially continuous layer over a zone of the element, while the hardness in the thickness of the layer varies by less than 10 HRC over the said zone.

In particular according to the invention, it is possible to propose a drill-string liner element of the type comprising at least one hardbanding layer, wherein the hardbanding layer comprises one or more strands of filler metal, each having a width between 1 and 5 millimeters and deposited in adjacent manner to form a substantially continuous layer over a zone of the element, such that a hardness measured at different points of a given local radial thickness of the layer varies by less than 10 HRC in the said local radial thickness, especially when the measurement points are more than 0.5 mm apart and better, more than 1 mm. Advantageously, for more than 95%, and better for the entirety of the radial thicknesses of the hardbanding layer, maximum variations of hardness between the external periphery and the bottom of the hardbanding layer are observed as variations of hardness smaller than 10 HRC for each of the radial thicknesses.

An element of this type offers numerous advantages, which will be considered later. Above all, these advantages are practically independent of the composition of the filler material. They may be obtained with traditional electrode rods.

A method for hardbanding a metal piece with filler metal is also proposed in which a welding installation comprising a torch of MIG/MAG type, a tool holder on which the torch is mounted and a piece support are used, the method comprising the following steps:

a. placing a metal piece comprising a peripheral surface to be hardbanded at least partly on the piece support;

b. bringing the tool holder together with the torch and the piece support into an initial relative position in which the torch is directed at a first place of the peripheral surface;

c. displacing the tool holder and the piece support relative to one another up to a final position, in which the torch is directed at a second place of the peripheral surface, axially removed from the first place;

d. operating the torch in cold-welding mode during at least part of the relative displacement of the tool holder and piece support in order to deposit one or more strands of filler metal in adjacent manner while forming a substantially continuous layer over at least part of the peripheral surface extending from the first to the second place, the torch being operated in cold-welding mode during at least part of the simultaneous displacement in translation and rotation.

The proposed process makes it possible firstly to obtain a liner element such as proposed hereinabove. On this point, the term "hardbanding" is used here in the sense generally attributed to it in the art, which corresponds to deposition of a layer of filler material, or hardbanding layer, whether this layer is deposited on the naked element ("first" hardbanding) or is replacing a previous hardbanding layer.

The method in question additionally has numerous advantages, which will be discussed later.

Other characteristics and advantages of the invention will become apparent upon reading the detailed description hereinafter and also from the drawings, wherein:

FIG. 20 shows a sleeve as the drill-string liner element according to yet another aspect of the invention.

The attached drawings will be able not only to be used to supplement the invention but also to contribute to the definition thereof, as the case may be.

Figure 1:
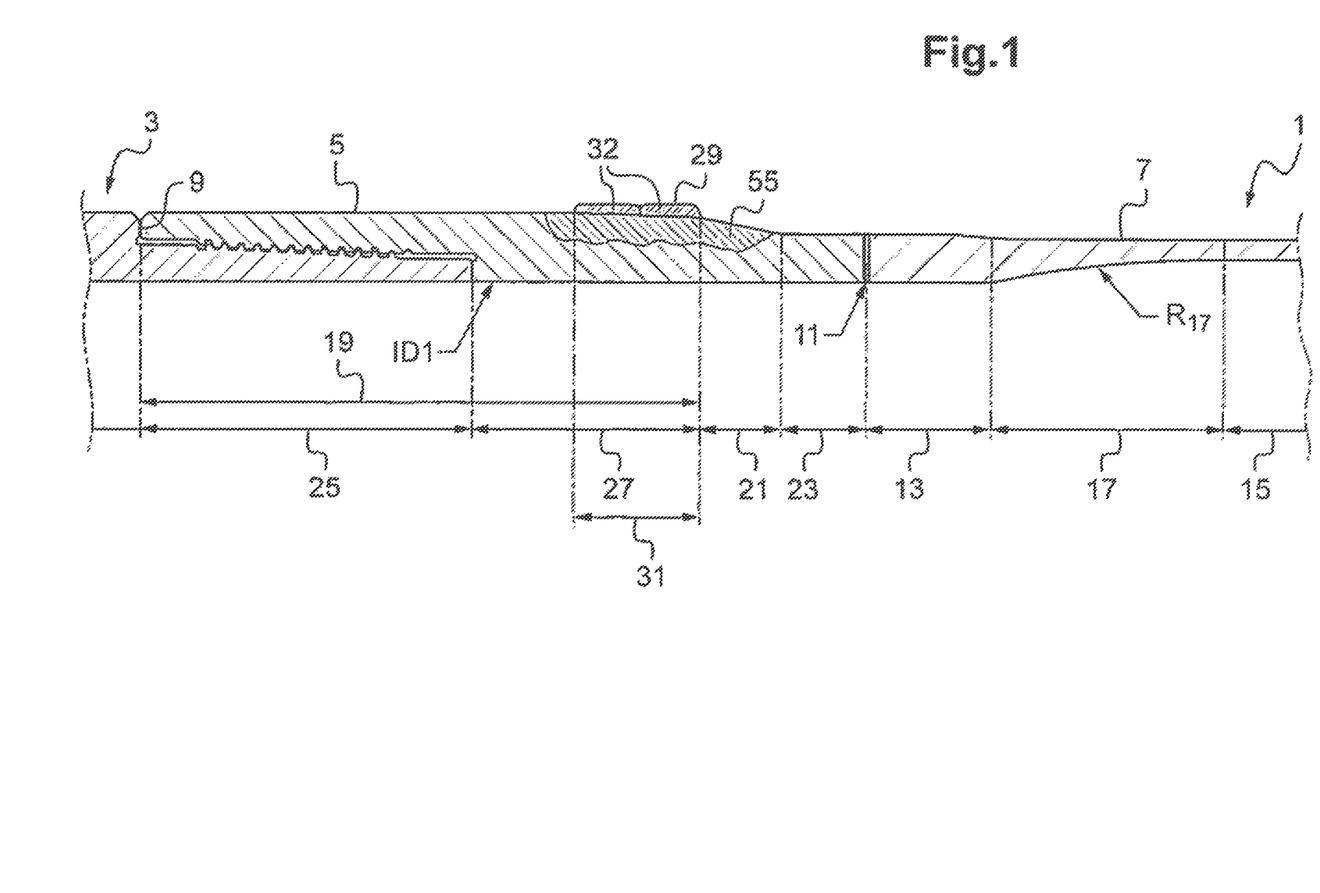
FIG. 1 is a view in partial longitudinal section of a liner element according to the prior art.

FIG. 1 shows a portion of the end of a drill pipe 1 as the drill-string liner element 1. Pipe 1 has a general appearance of a straight cylinder. The end portion of pipe 1 is screwed together with an end portion of an adjacent drill pipe 3 in the drill string.

The end portion of FIG. 1 comprises a part forming a joint 5, also referred to as "tool joint" in the art, and a terminal portion of a median part of pipe 1 forming a pipe body 7. Pipe 1 additionally comprises a second part forming a joint, not shown, at the end of pipe body 7 opposite joint 5.

Joint 5 is assembled on pipe body 7 by a weld 11. In general, weld 11 is formed by a friction weld.

Joint 5 has a free end 9, which corresponds to a free end of pipe 1. At an end opposite its free end 9, joint 5 is assembled on pipe body 7.

The terminal portion of pipe body 7 comprises a junction portion 13, close to joint 5, a median portion 15, and an intermediate portion 17 connecting junction portion 13 to median portion 15.

Junction portion 13 has a thickness e13, an outside diameter OD13 and an inside diameter ID13 that are almost constant over its length. Median portion 15 has a thickness e15, an outside diameter OD15 and an inside diameter ID15 that are almost constant over its length. Outside diameter OD15 of median portion 15 is close to outside diameter OD13 of junction portion 13, while inside diameter ID15 of median portion 15 is substantially larger than inside diameter ID13 of junction portion 13. As a result, thickness e15 of median portion 15 is substantially smaller than thickness e13 of junction portion 13.

Intermediate portion 17 has an outside diameter OD17 that is almost constant over its length and close to outside diameter OD13 of junction portion 13, while its inside diameter ID17 increases from a value close to inside diameter ID13 of junction portion 13 to a value close to inside diameter ID15 of the median portion, from its end close to junction portion 13 to its end close to median portion 15, according to a curve of radius R17. As a result, thickness e17 of the intermediate portion varies inversely with its inside diameter 17 over its length.

Joint 5 has a main portion 19 adjacent to free end 9, a junction portion 23 close to weld 11 and an intermediate portion 21 connecting main portion 19 to junction portion 23. Main portion 19 is composed of a female-threaded portion 25 close to free end 9 and of a massive portion 27 close to intermediate portion 21.

Main portion 19 has an outside diameter OD19 that is almost constant over its length. Junction portion 23 has an outside diameter OD23 that is almost constant over its length, substantially smaller than outside diameter OD19 of main portion 19 and close to outside diameter OD13 of junction portion 13, and an inside diameter ID23 that is almost constant over its length and close to inside diameter ID13 of junction portion 13.

Massive portion 27 has an inside diameter ID27 that is almost constant over its length and close to inside diameter ID23 of junction portion 23. Intermediate portion 21 has an outside diameter OD21 that decreases linearly from its end close to main portion 19 to its end close to junction portion 23, from a value close to outside diameter OD19 of the main portion to a value close to outside diameter OD23 of junction portion 23. Intermediate portion 21 also has an outside surface of frustoconical appearance. Intermediate portion 21 has an inside diameter ID21 that is almost constant over its length and the value of which is close to inside diameter ID19 of the main portion.

In known manner, pipe 1 has a hardened surface lining, also known as hardbanding layer 29 in the art, that extends continuously over a zone 31 of joint 5 corresponding to a longitudinal segment of this joint 5. Hardbanded zone 31 extends over the exterior surface of naked pipe 1, which is also known as the skin of the environment, from approximately the middle of massive part 27 approximately, and it ends close to intermediate portion 21. In other words, intermediate zone 21 is devoid of any hardbanding layer. Typically, hardbanded zone 31 has an extent between 70 and 100 millimeters in the longitudinal direction of pipe 1.

Hardbanding layer 29 of FIG. 1 is formed in a manner known in itself. It comprises several bands 32 of a filler material, the number of which is two here, of annular shape, deposited in adjacent manner one over the other so as to cover hardbanded zone 31 continuously. Each band 32 has a width between 15 and 30 millimeters, typically close to 25 millimeters. The thickness of each band 32, i.e. the distance that separates the skin of pipe 1 from the surface of band 32, is between 2.4 and 4.5 millimeters, with a tolerance between 0.5 and 1 millimeter relative to a nominal value of thickness. For example, the real thickness of each layer 32 is between 2.4 and 4 millimeters for a nominal value of 2.4 millimeters.

Figure 2:
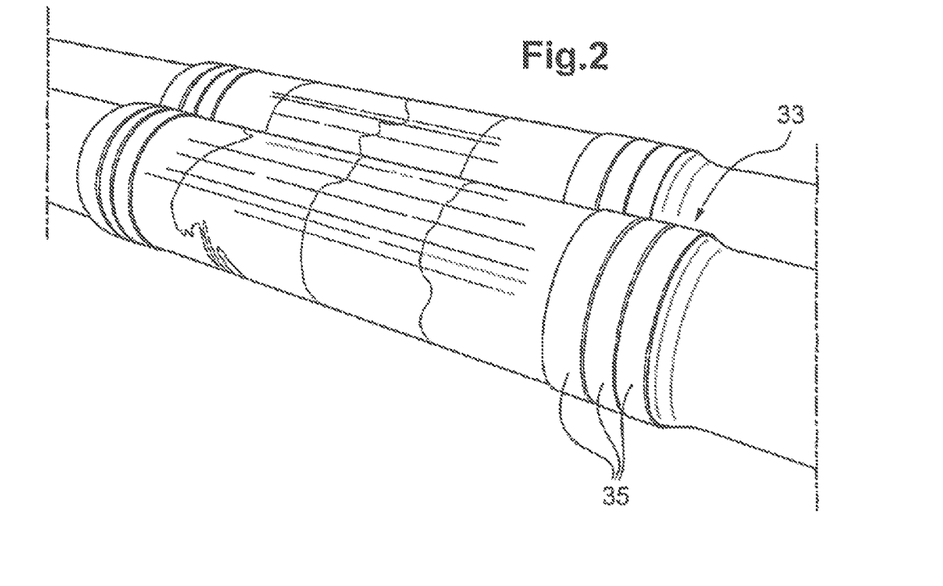
FIG. 2 shows another liner element according to the prior art.

FIG. 2 shows another example of a drill pipe provided with a hardbanding layer 33 that covers a zone analogous to hardbanded zone 31 of FIG. 1. Hardbanding layer 33 is analogous to layer 29 of FIG. 1, with the exception that it has three mutually adjacent bands 35 of material instead of two.

Figure 3:
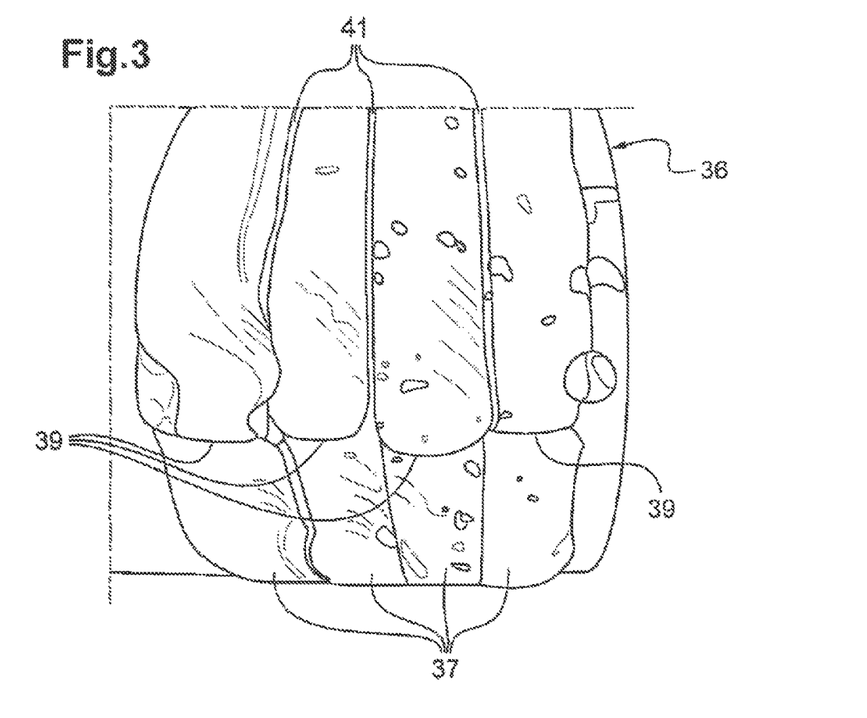
FIG. 3 shows a hardbanding layer according to the prior art.

FIG. 3 shows yet another example of a hardbanding layer 36 formed in a manner analogous to layer 29 of FIG. 1, with the exception that it has four mutually adjacent bands 37 of material instead of two.

Each band 37 has a first zone 39 overlapping itself. In other words, each band 37 extends over an angle of greater than 360°, typically over 365 to 370°, to guarantee continuity of material over the hardbanded zone.

Two mutually adjacent bands 37 straddle one another each time in a second overlap zone 41. Each second overlap zone 41 forms a particularly hard extra thickness of filler material.

In particular, the surface hardness of each second overlap zone 41 is substantially greater than the hardness of bands 37, especially at the surface thereof. The hardness of bands 37 depends in principle on the composition of the filler metal used. A nominal hardness generally corresponds to a particular composition. For example, this nominal value of hardness may be indicated in relation to a reference electrode rod. This nominal hardness, related to the composition of the filler metal, corresponds closely to the maximum value of hardness of the hardbanding layer.

In practice, the hardness in hardbanding layer 36 varies very broadly relative to the nominal value, not only in the thickness of each band 37, but also in its width, as well as from one band 37 to another. In other words, the hardness in hardbanding layer 36 is very heterogeneous. In addition, although the hardness generally tends to decrease from the surface of the layer to the interface with pipe 1, it nevertheless evolves very irregularly in the longitudinal direction of pipe 1.

Typically, with an electrode rod having a nominal hardness of approximately 65 HRC, values of hardness between 35, especially at the interface with the skin, and 65 HRC, in particular at the surface of layer 36, may be observed in hardbanding layer 36.

What has just been described in relation to FIG. 3 is also applicable for the hardbanding layers of FIGS. 1 to 3 and more generally for the traditional hardbanding layers.

In the traditional arrangement of hardbanding layers, such as shown in FIGS. 1 to 3 in particular, each band of material may be formed by means of a torch of MIG/MAG type, driven by a combined movement of oscillation at constant speed and amplitude and of rotation around the axis of the surface to be hardbanded. The rotation is executed over 365 to 370°, after which the torch is shifted along the longitudinal direction of the pipe in order to form an adjacent band of material in the same way. In general, overlap with the preceding band is provided. This coverage can be achieved by shifting the torch during a few oscillations, such as three, for example.

Most often, the hardbanding layer is formed in a single pass, wherein bands 37 are deposited successively, each with a thickness corresponding to the nominal thickness of the layer, typically between 2.4 and 4.5 millimeters.

In rare cases it may be that the hardbanding layer is formed in several successive passes, each performed according to the method outlined above. In this case, after a first succession of bands has been deposited on the hardbanded zone, a new band is deposited on top of each of the previously deposited bands. Each pass improves the dilution ratio in the thickness of the layer.

The rough hardbanding layer is generally ground in order to remove spatter of filler metal, to decrease the extra thickness of the material in the zone of angular hardbanding and to reduce the disparities between the bands of material, not unlike a resurfacing process.

Figure 4:
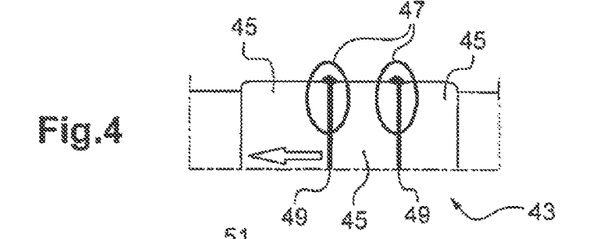
FIGS. 4 to 6 schematically show a hardbanding layer according to the prior art.
Figure 5:
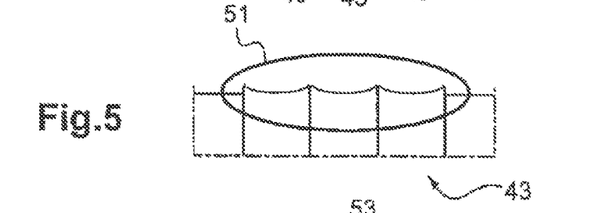
Figure 6:
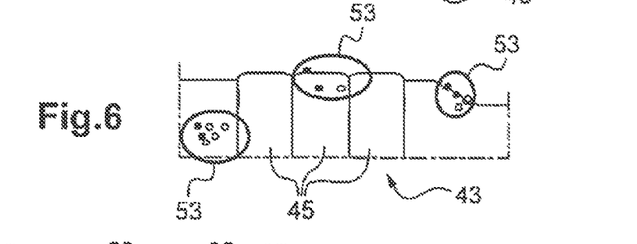

FIGS. 4 to 6 illustrate characteristics related to the traditional arrangement of a hardbanding layer. These characteristics are most often visible to the naked eye.

In FIG. 4, a hardbanding layer 43 comprises three bands 45 of material. Between each two adjacent bands 43 it is possible to distinguish an extra thickness 47 of material corresponding to a secondary overlap zone 49.

In FIG. 5, each band 45 has a concave profile 51.

In FIG. 6, hardbanding layer 43 has spatters 53 of filler material, which are incrusted on the surface of bands 45. Spatters 53 may also become attached to the skin of the drill pipe, over part of this skin close to hardbanding layer 43. Spatters 53 may occur in combination with extra thicknesses 47 and/or with the concave profile of bands 45.

Returning now to FIG. 1:

Therein a heat-affected zone 55 is shown that corresponds to hardbanding layer 29. Heat-affected zone 55 results mainly from deposition of the filler material at high temperature, generally on the order of 1500 to 2000° C. In this heat-affected zone 55, the steel constituting the wall of drill pipe 1 has larger grains than in the rest of the pipe. Larger grains embrittle the steel. The hardness in the heat-affected zone is considerably higher than the hardness of the base material, typically in the order of 10 to 30%.

Heat-affected zone 55 extends underneath hardbanded zone 31, from the skin of pipe 1 to a large depth, typically up to approximately 10 millimeters of depth. More generally, the depth of the heat-affected zone is between 2 and 5 times the thickness of the hardbanding layer.

In the longitudinal direction of pipe 1, heat-affected zone 55 extends beyond hardbanded zone 31 on both sides, toward free end 9 of joint 5 and toward weld 11. In particular, heat affected zone 55 extends over practically the entire length of intermediate zone 21. The depth of heat-affected zone 55 is substantially constant over the length of this zone.

The shape and extent of heat-affected zone 55 result quite directly from the arrangement of hardbanding layer 29. In other words, what has just been described is a heat-affected zone characteristic of the traditional arrangement of a hardbanding layer.

Figure 7:
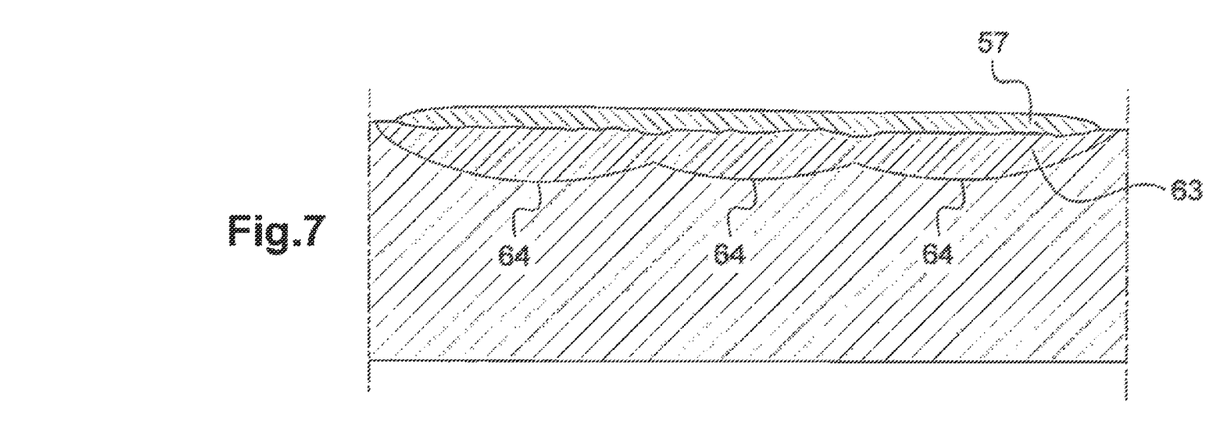
FIG. 7 shows a macrograph of a hardbanding layer according to the prior art.

FIG. 7 shows in detail the evolution of a heat-affected zone 63 underneath a hardbanding layer 57 formed in traditional manner, such as shown in FIGS. 1 to 3. Therein three mutually adjacent sub-zones 64 are distinguished, of shape substantially analogous to one another, and the union of which corresponds to heat-affected zone 63. This sub-zone 64 corresponds to one respective band of hardbanding layer 57 (not visible in FIG. 7).

Each sub-zone 64 has a concave appearance with concavity directed toward the longitudinal axis of the tube. Each sub-zone 64 has a depth that varies between 5 and 12 millimeters, while the thickness of layer 57 varies between approximately 2.5 and 3 millimeters. The maximum depth of each sub-zone 64 corresponds almost to half of the longitudinal extent of this sub-zone 63.

Here the maximum depth of the heat-affected zone is between approximately 1.5 and 3 times the thickness of the hardbanding layer.

Figure 8:
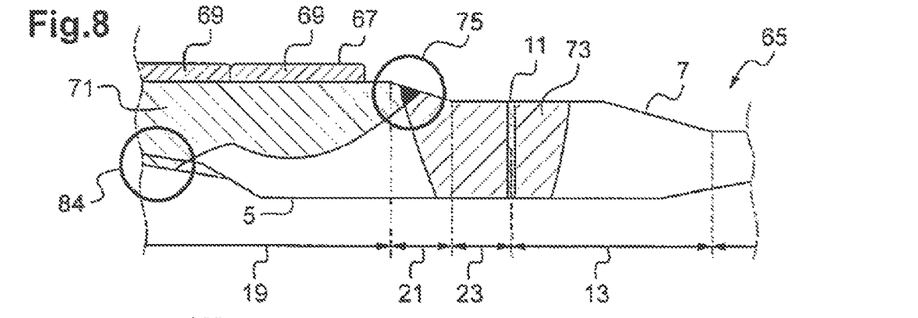
FIG. 8 is a view in partial longitudinal section of another liner element according to the prior art.

FIG. 8 partly shows a joint 65 of shape analogous to that of joint 5 of FIG. 1. Joint 65 has a hardbanding layer 67 of conformation analogous to the hardbanding layers described hereinabove. Layer 67 covers a zone 68 that extends around joint 65 over a portion of part 27 and ends close to the proximal part of portion 21. Hardbanding layer 67 has several mutually adjacent bands 69 of material, only one of which is shown over its entire length in FIG. 8.

Heat-affected zone 71 corresponding to hardbanding layer 67 extends beyond this layer in longitudinal direction of joint 5, towards weld 11.

A second heat-affected zone 73 results from the operation of welding of joint 5 to the body of pipe 7 close to weld 11 and extends on both sides thereof.

Heat affected zone 71 encroaches on intermediate zone 21 sufficiently to create a zone 75 that straddles second heat-affected zone 73.

The depth of this zone 84 varies between 4 and 6 times the thickness of bands 80, 82.

Figure 9:
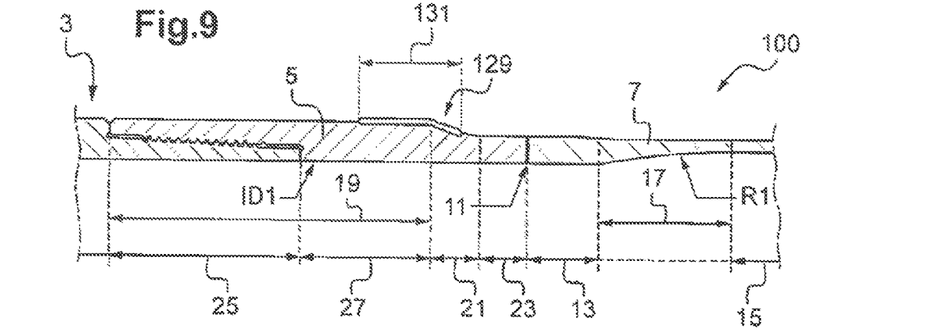
FIG. 9 is a view in partial longitudinal section of a liner element according to the invention.

Under certain conditions, heat-affected zone 71 may reach a zone 77 at the base of the thread of threaded zone 25, and may even traverse the connection over its entire thickness. This occurs frequently in the case of small-diameter joints, typically with outside diameter smaller than 5 inches. This explains why the small-diameter joints are generally devoid of hardbanding layer. Referring now to FIG. 9:

It shows an end of a drill pipe 100 according to one aspect of the invention. Pipe 100 is shaped analogously to pipe 1 of FIG. 1. Numerical references identical to those of FIG. 1 denote analogous elements.

Drill pipe 100 has at least one hardbanding layer 129 covering zone 131 corresponding to a longitudinal segment of pipe 100.

Hardbanding layer 129 has a particular configuration or arrangement different from that of the traditional layers, such as layer 29 for example. Nevertheless, the composition of the filler metal used may be identical.

Hardbanding layer 129 comprises one or more strands of material, each having a width between 1 and 5 mm and being deposited in adjacent manner to form a substantially continuous layer of material over hardbanded zone 131. In a currently preferred embodiment, the width of the strands is close to 2 millimeters.

In contrast to the bands of hardbanding layer 29, the strands of hardbanding layer 129 are devoid of any angular hardbanding zone between strands.

According to a complementary aspect of the invention, the hardness in the thickness of the layer varies by less than 10 HRC, preferably by less than 5 HRC. Preferably the hardness evolves in monotonic manner in the thickness of the layer. In particular, it decreases from the surface of layer 129 to the skin of pipe 100.

In particular, the hardness for any given local radial thickness of the hardbanding layer may vary by less than 10 HRC, even better by less than 8 HRC, in each of these local radial thicknesses.

The Applicant has observed that a hardbanding layer of the type of layer 129 improves the performances of pipe 100, especially concerning the service life. Hardbanding layer 129 wears away progressively and regularly. Thus the service life of pipe 100 can be predicted more reliably than in the past. In particular, this service life may be estimated reliably from tests performed exclusively on the surface of this layer. The properties of layer 129 can be observed regardless of the composition of the filler metal. This makes it possible to improve the performances of pipe 100 by using traditional electrode rods. This may also make it possible to reduce the nominal thickness of the hardbanding layer, since the wear of this layer is better controlled. In other words, it is practically no longer necessary to deposit filler metal in excess, or in any case it is possible to deposit less compared with the value of thickness calculated to guarantee that the element achieves the service life being sought.

FIG. 9 reveals a supplementary aspect of the invention, wherein hardbanded zone 131 extends over at least part of transition zone 21 of pipe 100, which in this case is adjacent to the main portion. From the side opposite transition zone 21, hardbanded zone 131 extends over part of massive portion 27, in this case up to approximately half of the length of that portion. In the embodiment presented here, the hardbanded zone extends over approximately half of the length of the transition zone, which already makes it possible to improve the service life of the pipe greatly. This also makes it possible to protect the pipe at the level of the ridge that separates this transition zone 21 from massive part 27. As a variant, the hardbanded zone could extend more or less over transition zone 21, in particular between 1 and 2 thirds of the length of that latter.

Figure 13:
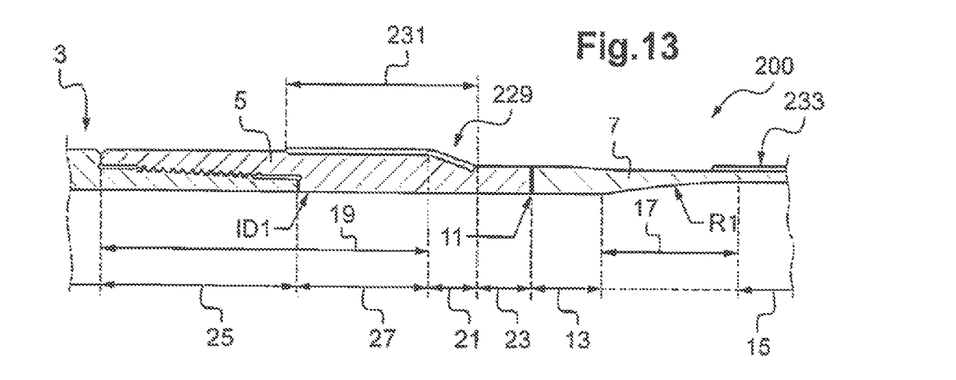
FIG. 13 is a view in partial longitudinal section of another liner element according to the invention.
Figure 14:
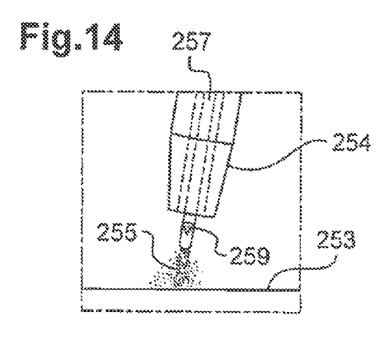
FIGS. 14 to 17 show a deposit of filler material according to the invention.

FIG. 13 shows an end of pipe 200 as a variant of the end of pipe 100 of FIG. 9.

The end of pipe 200 comprises a hardbanding layer 229 configured in a manner analogous to that of layer 129 of FIG. 9 and covering a zone 231. According to a first aspect of this particular embodiment, hardbanded zone 231 extends over the entirety of transition zone 21. Because the pipes of the type of pipe 200 are most often gripped and screwed at the level of transition zone 21, these pipes 200 are protected against abrasion due to the tools used.

According to a second aspect of this embodiment, which is complementary or alternative to the first, hardbanded zone 231 extends over at least part of female-threaded section 25.

According to a third aspect of this embodiment, which is optional, complementary to or alternative to the first and second aspects, drill pipe 200 additionally comprises a second hardbanding layer 233, which covers a zone extending over part of the exterior surface of pipe 15. The second hardbanding layer has a configuration analogous to that of layer 129 of FIG. 9.

Figure 11:
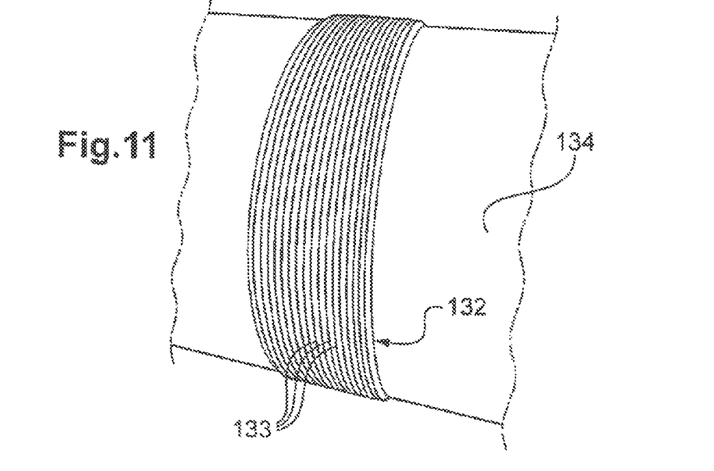
FIG. 11 shows a hardbanding layer according to the invention.

FIG. 11 shows an advantageous development of the invention, in which the hardbanding layer according to the invention comprises a single strand 132 of material of helicoidal form and joined turns 133. Strand 132 of material winds around exterior surface 134 of the naked pipe in such a way as to cover the hardbanded zone. In this case, each turn has a width of approximately 1 millimeter and a nominal thickness of 2.8 millimeters (mean thickness close to 3 millimeters). More generally, the width of strand 131 is between 2 and 4 millimeters, while its thickness is between 2 and 4 millimeters.

In contrast to hardbanding layers of the prior art, the hardbanding layer according to the invention is devoid of an angular overlapping zone.

According to a complementary aspect of the invention, the particular arrangement of the hardbanding layer is associated with a heat-affected zone that extends over at least 2 millimeters of depth, regardless of the thickness of the hardbanding layer.

Figure 10:
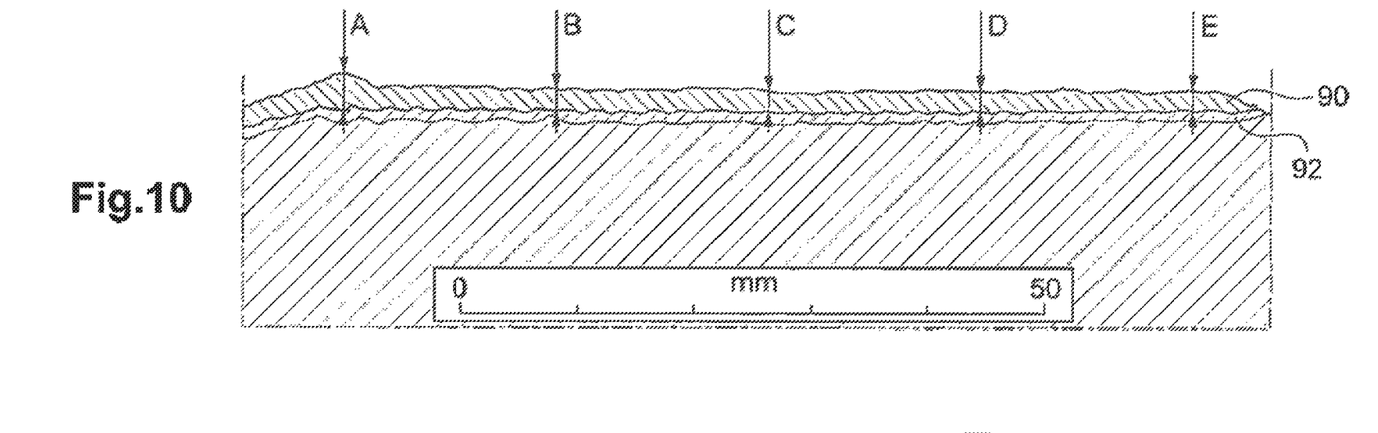
FIG. 10 shows a macrograph of a hardbanding layer according to the invention.

Reference is made to FIG. 10 which shows a hardbanding layer 90 and the extent of heat-affected zone 92 in a drill pipe according to the invention for one thickness of strand. In this connection, Table 1 below indicates in:

Column I: Point of measurement in FIG. 10, disposed on a generating line of the exterior surface covered by a layer.
Column II: distance from the point of measurement to point A (in millimeters)
Column III: thickness of the hardbanding layer at the point of measurement (in millimeters);
Column IV: depth of the heat-affected zone at the point of measurement (in millimeters)
Column V: thickness/depth ratio in the heat-affected zone (in %).

TABLE I

| I | II | III | IV | V |
|---|---|---|---|---|
| A | 0 | 3.88 | 1.38 | 35 |
| B | 154 | 2.00 | 1.34 | 67 |
| C | 320 | 1.92 | 1.07 | 56 |
| D | 463 | 2.00 | 0.96 | 48 |
| E | 592 | 1.96 | 0.96 | 49 |
| mean | | 2.35 | 1.14 | 51 |

With the exception of a zone of small extent surrounding point A, the thickness of the strand is close to 2 millimeters. It varies between 1.92 millimeters and 2 millimeters. The thickness is homogeneous.

At point A, the layer has a thickness of 3.88 millimeters. It is an extra thickness intended to reinforce the junction between the frustoconical zone and the cylindrical zone. This extra thickness is optional: in practice, the hardbanding layer may also have a thickness of approximately two millimeters close to point A.

The heat-affected zone is smaller than 1.5 mm. The depth of the heat-affected zone is between 0.96 and 1.38 millimeters. The depth of the heat-affected zone at a point of measurement is practically independent of the thickness of the hardbanding layer at the same point.

In practice, the artifact values of thickness or depth due to the presence of a grain of hard material could modify the homogeneity of the hardbanding layer at the point in question and possibly the corresponding heat-affected zone.

Figure 12:
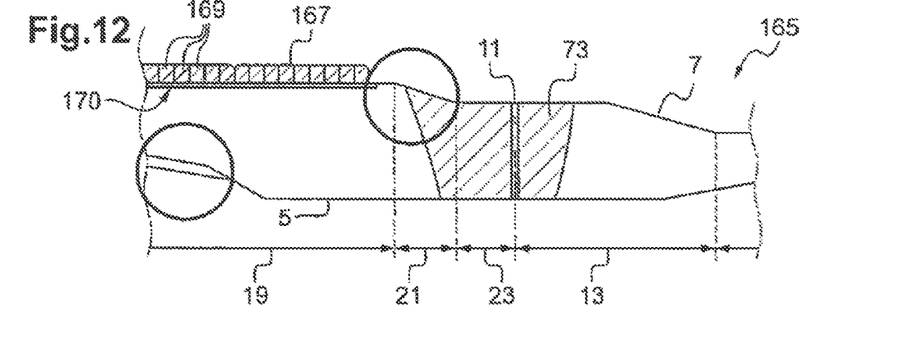
FIG. 12 is a view in partial longitudinal section of another liner element according to the invention.

FIG. 12 shows yet another variant of the invention, in which a joint 165 is furnished with a hardbanding layer 167 that covers a zone extending over a length close to that of hardbanding layer 67 of FIG. 8. Hardbanding layer 167 is formed in a manner analogous to layer 129 of FIG. 9. In particular, layer 167 comprises a strand of material deposited along a helical path wherein turns 169 overlap.

Joint 165 has a heat-affected zone 170 that is much smaller than in the case of FIG. 8: not only does heat-affected zone 170 extend much less deeply than zone 71 of FIG. 8, but also it practically does not go beyond hardbanding layer 167 axially, either toward transition zone 21 or in opposite direction.

The absence of straddling between first heat-affected zone 170 and second heat-affected zone 73 is obvious. Thus the life of joint 165 is improved.

FIG. 12 also illustrates another aspect of the invention, according to which a drill-string liner element is provided that has at least one segment of small thickness furnished with a hardbanding layer that covers a zone extending over at least part of the segment of small thickness and that exhibits the particular configuration described in relation with FIG. 9. In a particular development, the element in question comprises a threaded joint or "tool joint", of the same type as joint 165, provided with a hardbanding layer 167 covering a zone extending over at least part of main portion 19, this latter having a small thickness. The invention also relates more particularly to segments of very small thickness, typically of less than 10 millimeters.

"Small diameter" will be understood as an outside diameter smaller than approximately 5 inches. Small thickness will be understood as a thickness generally smaller than 20 millimeters.

A method will now be described that makes it possible to obtain the particular configuration of a hardbanding layer described in the foregoing, in relation with layer 129 of FIG. 9 in particular.

Firstly, FIGS. 14 to 17 illustrate a particular step of the method according to the invention, wherein a bead 251 of filler metal is deposited on a surface 253 to be hardbanded, typically a part of the exterior surface of drill pipes 100 or 200. The step uses a welding torch 254.

The deposit in question uses a short electric arc 255 between the end of an electrode rod 257 and surface 253 to be hardbanded. In other words, torch 253 is close to surface 253 to be hardbanded. Electrode rod 257 may be of any composition adapted to the creation of a hardbanding layer of traditional type, for example of the type sold by ARNCO, Castolin or else Tuboscope. During the period of existence of electric arc 255, electrode rod 257 is advanced relative to torch 254 toward the material pool. This advance movement is symbolized by arrow 259 in FIG. 14.

Figure 15:
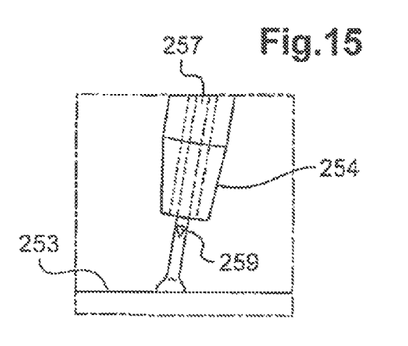

In FIG. 15, when part of electrode rod 257 has melted into the weld pool, the electric arc is turned off by reducing the current intensity in electrode rod 257.

Figure 16:
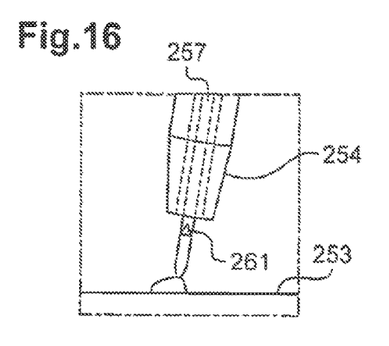

As can be seen in FIG. 16, electrode rod 257 is retracted relative to torch 254 (movement symbolized by arrow 261). The end of electrode rod 257 moves away from surface 253. A bead 251 of filler metal is formed on the surface to be hardbanded, which is detached from electrode rod 257.

Figure 17:
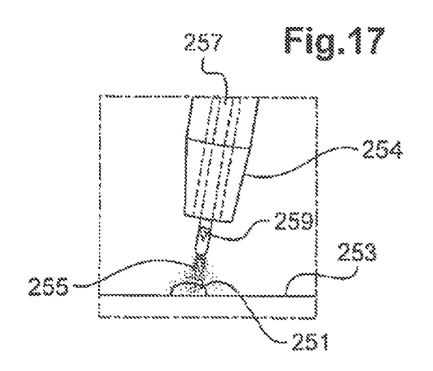

The current intensity in electrode rod 257 is increased and the electrode rod is advanced relative to torch 254, which corresponds to the situation of FIG. 17. Between the situation of FIG. 16 and that of FIG. 17, torch 253 has been shifted relative to surface 253 in such a way that the end of electrode rod 257 points toward part of bead 251. In practice, the objective is overlap of approximately 1 millimeter between two beads of approximately 2 millimeters diameter, or in other words of approximately half of the diameter of the bead.

This manner of depositing bead 251 in 3 sub-steps, one of which takes place with input of thermal energy, considerably reduces the heat transmitted to surface 250. This is an effective way of obtaining a heat-affected zone of small extent. In particular, this makes it possible to form a hardbanding layer with a heat-affected zone that extends over less than 2 millimeters of depth.

This manner of operating welding torch 254 is known as "cold-welding mode". This mode is equivalent to depositing the filler material one bead at a time.

Figure 18:
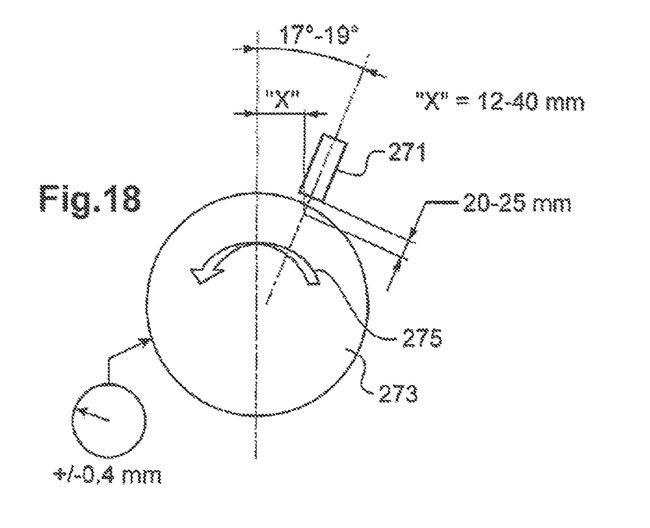
FIG. 18 illustrates an installation for hardbanding a drill-string liner element according to the invention.

FIG. 18 shows an installation for the method according to the invention.

The installation comprises a welding torch 271 analogous to torch 254 of FIGS. 14 to 17, maintained in position relative to a piece 273 to be hardbanded. The installation integrates a mechanical system, by means of which the torch is mounted on the tool holder and which makes it possible to move this torch forward and backward relative to the tool holder. The mechanical system in question may be based on the principle of a motorized drive roller.

Piece 273 has a shape generated by revolution, at least over the part of this piece that has to be hardbanded. Piece 237 may be a drill pipe analogous to pipe 100 of FIG. 1.

Piece 273 is made to rotate around its axis, for example by means of a rotating mandrel. This rotational movement is represented by arrow 275. Torch 271 is subjected to an advance movement in a direction parallel to the axis of rotation of the piece. Preferably the advance movement is continuous. The advance and rotational movements are mutually synchronized. Among other things, this makes it possible to form a hardbanding layer comprising a helicoidal strand centered around the axis of piece 273. For example, the speed of rotation is lower than 10 revolutions per minute, while the speed of displacement is lower than 15 millimeters per minute. According to one aspect of the method, the speed of rotation and the speed of displacement are synchronized in such a way that the strand extends in overlapping turns.

In particular, this synchronization is such that the deposition of a new turn takes place by targeting a part of the preceding turn rather than the exterior surface of piece 273. This makes it possible to reduce the heat transmitted to the piece even more and it contributes to achieving a heat-affected zone of small extent. These speeds are also adapted as a function of the desired strand thickness. The shape and size of the bead may be modified by adjusting one or more of the following parameters: inclination/position of the torch (influence of the shape of the strand and therefore of its length), welding power, speed of rotation, speed of displacement of the torch.

In the present case, two adjacent turns of material straddle one another mutually over a zone of width between 1 and 2 millimeters.

The longitudinal axis of the torch is inclined at an angle A relative to the torch support. The value of angle A is such that the arc is generated between the previously deposited strand rather than with the surface of the piece. This also contributes to reducing the resulting heat-affected zone. For example, the angle may be smaller than 40°.

The current intensity is between 180 and 250 amperes and the voltage between 10 and 25 volts.

In particular, the method has made it possible to obtain the hardbanding layer of FIG. 10.

What has just been described is a method for depositing a hardbanding layer that makes it possible, among other aspects, to form a hardbanding layer comprising one or more strands of filler metal each having a width between 1 and 5 millimeters and being deposited in adjacent manner to form a substantially continuous layer over a zone of the element, while the hardness in the thickness of the layer varies by less than 5 HRC over the zone in question.

Compared with other methods capable of forming such a hardbanding layer, the method according to the invention presents the following advantages:

The hardbanding layer can be formed as a single deposit of one or more strands, and so it is not necessary to pass once again over an already hardbanded part. There is no angular overlap.

The layer can be formed with electrode rods of traditional composition.

The described method has the ability to be used more widely, in particular to form a hardbanding layer, the arrangement of which could differ from the invention. Compared with traditional methods, the described method has the following advantages:

It is associated with a heat-affected zone of small depth;

It generates little or no material spatter, because the electric arc is more stable; consequently, it makes any grinding operation optional. Nevertheless, such an operation could be undertaken in order to modify the surface condition and the abrasive character of the surface.

It does not necessitate preliminary heating of the piece to be hardbanded, which results on the one hand in energy savings and on the other hand in a gain in time, because of the fact that the hardbanded piece does not have to be cooled or at least can be cooled in a shorter time;

It substantially improves the phenomenon of dilution in the hardbanding layer even in the case of a deposit applied in one pass. For example, the Applicant has observed a dilution rate smaller than 5% in the hardbanding layer, which cannot be achieved with the traditional methods, except for the most superficial zones of the layer and provided successive passes are used. This is shown in the following Table 2, which compares the distribution between hardbanding material (HB) and the material of the pipe (BASE) for the three applications of a traditional method with the single application of the method according to the invention.

TABLE 2

|  | HB (%) | BASE (%) |
|---|---|---|
| Application 1 | 60 | 40 |
| Application 2 | 84 | 16 |
| Application 3 | 94 | 6 |
| Single application | 95 | 5 |

Figure 19:
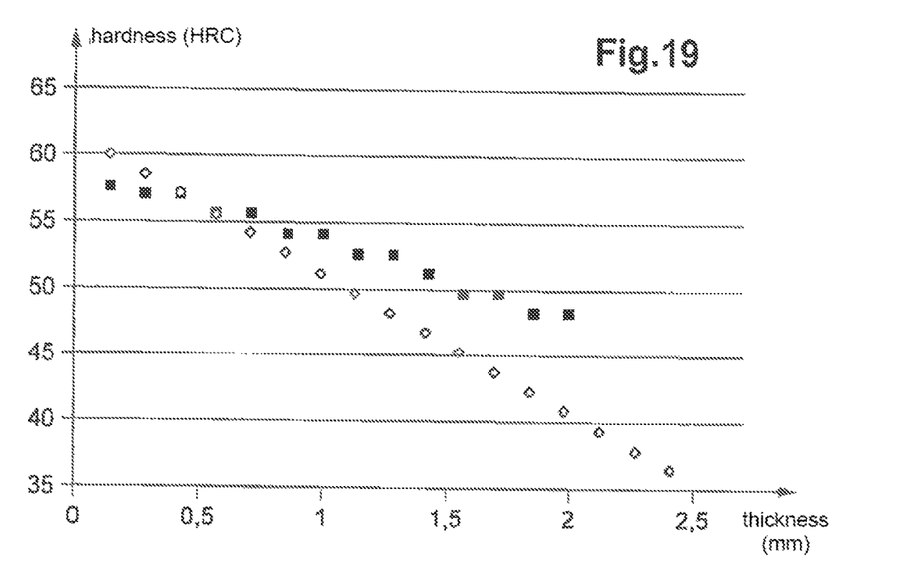
FIG. 19 shows a graph illustrating the variations of hardness in the thickness of a hardbanding layer according to the invention.

Referring now to FIG. 19:

It shows a graph comparing the evolution of the hardness (on the ordinate), expressed as Vickers, as a function of the thickness (on the abscissa) of a traditional hardbanding layer (diamond) on the one hand (in a single pass), and of a hardbanding layer obtained by virtue of the method according to the invention (squares) on the other hand (in a single pass). Identical electrode rods were used in both cases.

The graph confirms that the hardness varies greatly with thickness in a traditional layer, in the present case between 60 HRC at the surface and 35 HRC at the interface with the skin.

It is obvious that the described method makes it possible to achieve a much smaller variation in the thickness of the hardbanding layer: decrease of the hardness with depth, in the present case from a value of 57.5 HRC at the surface to 48.5 HRC at the interface with the skin. It also makes it possible to achieve a variation of hardness smaller than 5 HRC in the thickness of the layer.

The measurement within the thickness as shown in FIG. 19 represents the values measured successively in the hardbanding layer along an axis perpendicular to the exterior surface of the naked element and perpendicular to the said skin.

In particular, the tendency observed in FIG. 19 can be observed for more than 80%, preferably the entirety, of the hardbanding layer. In this case, it is possible to measure the hardness of the hardbanding layer along an axis orthogonal to the skin at any point of the exterior surface of the naked element, covered by the hardbanding layer, and the measurements along this axis, for each given local radial thickness, exhibit a variation smaller than 10 HRC.

In particular, the maximum variation between all the measurements of hardness of the hardbanding layer, these measurements being made at different levels along an axis orthogonal to the skin, is smaller than 10 HRC. More particularly, the variation between two measurements corresponding to two measurement points along this orthogonal axis, the said measurement points being at least 0.5 mm apart, better at least 1 mm, and especially even better yet at least 2 mm, may be less than 10 HRC. In particular, the variation of hardness between a measurement point at the surface of the hardbanding layer and a measurement point within the hardbanding layer adjacent to the skin is smaller than 10 HRC, the two measurement points being disposed along an axis orthogonal to the said skin.

When five measurements of hardness are made at five different depths along an axis orthogonal to the skin within the hardbanding layer, and when these five measurements are repeated at positions spaced every 0.5 mm along the longitudinal axis of the tube, approximately twenty measurement positions are obtained. For each local radial thickness, the maximum variation observed in the hardness measured in the radial thickness is systematically smaller than 10 HRC for each of these measurement positions.

Measurements were made according to the protocol below in a hardbanding layer according to the invention, and the dispersion of these variations is given in the table below. It is observed in particular that more than 95% of the variations of hardness evaluated respectively for each given local radial thickness is smaller than 8 HRC. It is also observed that more than 60% of the variations of hardness evaluated respectively for each given local radial thickness is smaller than 6 HRC.

| Single layer according to the invention Class of variations | Proportion |
|---|---|
| Frequency of variations of hardness between 0 and 2 HRC | 25.00% |
| Frequency of variations of hardness between 2 and 4 HRC | 21.05% |
| Frequency of variations of hardness between 4 and 6 HRC | 31.58% |
| Frequency of variations of hardness between 6 and 8 HRC | 19.74% |
| Frequency of variations of hardness between 8 and 10 HRC | 2.63% |
| Frequency of variations of hardness greater than HRC | 0% |

For an embodiment in which the hardbanding layer is the sum of two hardbanding layers according to the invention disposed one over the other (in two passes), the observed dispersion of the variations of hardness evaluated in each case for a given radial thickness within the outermost hardbanding layer of these two layers is smaller than 8 HRC (see table below).

| Double layer according to the invention Class of variations | Proportion |
|---|---|
| Frequency of variations of hardness between 0 and 2 HRC | 20.00% |
| Frequency of variations of hardness between 2 and 4 HRC | 40.00% |
| Frequency of variations of hardness between 4 and 6 HRC | 20.00% |
| Frequency of variations of hardness between 6 and 8 HRC | 20.00% |
| Frequency of variations of hardness between 8 and 10 HRC | 0% |
| Frequency of variations of hardness greater than HRC | 0% |

Figure 20:
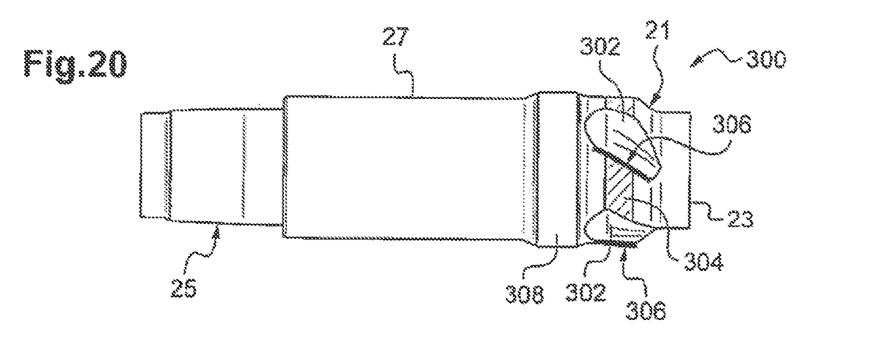
FIG. 20 shows a joint according to one aspect of the invention.

Referring now to FIG. 20, which shows a threaded joint 300: Threaded joint 300, in this case of male type, has a transition zone 21 separating a massive part 27, to which there is attached a threaded portion 25 of a portion 23 scheduled to be joined, especially by welding, to a pipe body (not shown).

Joint 300 has a particular configuration, known in the art by the name "Hydroclean Max TJ", in which it has a succession of recesses 302, which are open on its exterior surface and distributed angularly around joint 300. Recesses 302 are disposed in a manner straddling transition zone 21 and an adjacent portion of massive part 27.

According to one aspect of the invention, joint 300 is provided with a hardbanding layer 304, which extends over a partly annular zone separating recesses 302 from one another. Hardbanding layer 304 has the particular configuration described hereinabove.

According to yet another aspect of the invention, which may be complementary to the preceding or may replace it, each recess 302 is additionally furnished with a respective hardbanding layer 306, which extends over at least part of its surface, in the present case exclusively over a substantially radial portion of this surface.

FIG. 20 shows that joint 300 can be additionally furnished with a supplementary hardbanding layer 308, which covers an annular zone disposed close to recesses 302, on the side opposite transition zone 21.

Figure 21:
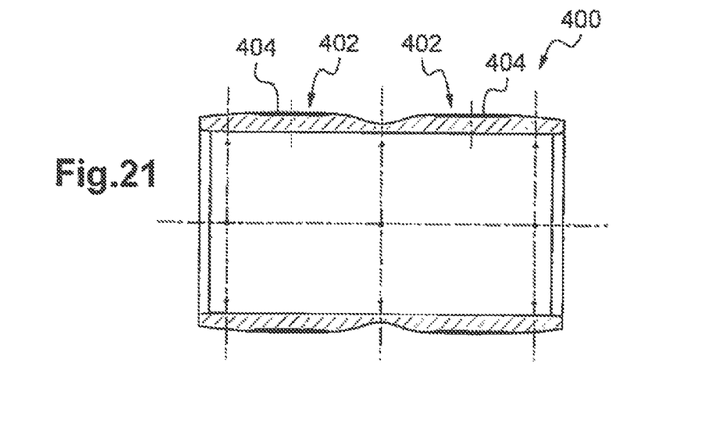

Referring now to FIG. 21, which shows a sleeve 400 as the drill-string liner element: Sleeve 400 has two symmetric segments 402, each corresponding to a connection of female type. According to one aspect of the invention, each segment 402 is furnished on the exterior with a hardbanding layer 404, which covers an annular zone extending over at least part of its length. In FIG. 21, sleeve 400 has a very small thickness (generally smaller than 10 millimeters). As a variant, sleeve 400 could have a larger thickness, but nevertheless smaller than 20 millimeters.

The invention claimed is:

1. A drill-string liner element comprising:
   at least one hardbanding layer;
   wherein the hardbanding layer comprises one or more strands of filler metal, each having a width between 1 and 5 millimeters and deposited in adjacent manner to form a substantially continuous layer over a zone of the element,
   wherein hardness in the thickness of the layer varies by less than 10 HRC over the zone.

2. An element according to claim 1, further comprising a heat-affected zone underneath the zone, wherein the heat-affected zone extends at most to 2millimeters of depth.

3. An element according to claim 1, wherein at least some of the strands extend at least partly in a helicoidal manner around the zone.

4. An element according to claim 1, wherein each strand has a thickness greater than 2.4 millimeters.

5. An element according to claim 1, further comprising a tubular part forming a pipe body, wherein the hardbanding layer is deposited over at least part of the body of the pipe.

6. An element according to claim 1, wherein the zone is situated over a tubular portion of the element of thickness smaller than approximately 20 millimeters.

7. An element according to claim 1, wherein the hardness for a given local radial thickness of the hard banding layer varies by less than 10 HRC in the local radial thickness.

8. An element according to claim 1, wherein the hardness in the thickness of the layer varies monotonically in the thickness of the layer.

9. An element according to claim 1, further comprising one or more open recesses on its exterior surface, wherein at least one of the hardbanding layers overlaps the recesses at least partly.

10. A method for hardbanding a metal piece with filler metal, wherein a welding installation including a torch of MIG/MAG type, a tool holder on which the torch is mounted, and a piece support are used, the method comprising:
   a) placing a metal piece comprising a peripheral surface to be hardbanded at least partly on the piece support;
   b) bringing the tool holder together with the torch and the piece support into an initial relative position in which the torch is directed at a first place of the peripheral surface;
   c) displacing the tool holder and the piece support relative to one another up to a final position, in which the torch is directed at a second place of the peripheral surface, axially removed from the first place;
   d) operating the torch in cold-welding mode during at least part of the relative displacement of the tool holder and piece support to deposit one or more strands of filler metal in adjacent manner while forming a substantially continuous layer over at least part of the peripheral surface extending from the first to the second place, the torch being operated in a cold-welding mode during at least part of simultaneous displacement in translation and rotation.

11. A method according to claim 10, wherein the peripheral surface has a general shape generated by revolution, and the displacing c) comprises:
   c1) displacing the tool holder and the piece support in relative translation such that the tool holder advances toward the final relative position; and
   c2) displacing the tool holder and the piece support during at least part of their relative translation such that the tool holder turns around the peripheral surface at a same time.

12. A method according to claim 11, wherein the operating d) comprises:
   d1) operating the torch in the cold-welding mode during at least part of the simultaneous displacement in translation and rotation;
   d2) immobilizing the torch relative to the tool holder at least during its operation in the cold-welding mode.

13. A method according to claim 12, wherein the displacing c2) comprises:
   c21) synchronizing the relative rotation of the tool holder and of the support with their relative translation during at least part of their relative translation such that the tool holder describes at least a portion of a helix relative to the peripheral surface; and
   wherein the operating d1) comprises:
   d11) operating the torch in cold-welding mode over at least part of the portion of a helix.

14. A method according to claim 12, wherein the displacing c2) comprises:
   c21) displacing the tool holder and the piece support in relative rotation such that the tool holder executes plural revolutions around the peripheral surface at the same time as the relative translation of the tool holder and of the piece support;
   wherein the operating d 1) comprises:
   d11) operating the torch in cold-welding mode during at least part of each revolution to deposit a strand of weld on the peripheral surface each time; and
   wherein the immobilizing d2) comprises:
   d21) maintaining the torch inclined relative to the tool holder, such that it is pointed during each revolution at the root of a weld strand deposited during the preceding revolution.

15. A method according to claim 13, wherein the synchronization is such that a portion of a helix has joined turns, at least in part.

16. A method according to claim 10, wherein the deposited strands each have a width between 1 and 5 millimeters.

17. A method according to claim 10, wherein the torch is immobilized relative to the tool holder, at least during its operation in cold-welding mode.

18. A method according to claim 11, wherein the tool holder and the support piece are translated relative to one another at a speed between 0 and 30 millimeters per minute during the displacing c1).

19. A method according to claim 11, wherein the tool holder and the piece support are moved in rotation relative to one another at a speed between 0 and 10revolutions per minute during the displacing c2).

20. A method according to claim 10, further comprising:
   e) maintaining the piece at ambient temperature, at least until operation of the torch.

21. A method according to claim 10, wherein the deposited strand or strands straddle one another over part of their length between 10 and 30%.

* * * * *